(12) United States Patent
Berg et al.

(10) Patent No.: US 11,779,005 B1
(45) Date of Patent: Oct. 10, 2023

(54) AGRICULTURAL PRODUCT RECOMMENDATION METHODS AND SYSTEMS

(71) Applicant: ADVANCED AGRILYTICS HOLDINGS, LLC, Huntington, IN (US)

(72) Inventors: William Kess Berg, Clayton, IN (US); Jon J. Fridgen, Tolono, IL (US)

(73) Assignee: ADVANCED AGRILYTICS HOLDINGS, LLC, Indianapolis, IN (US)

( * ) Notice: Subject to any disclaimer, the term of this patent is extended or adjusted under 35 U.S.C. 154(b) by 502 days.

(21) Appl. No.: 16/897,677

(22) Filed: Jun. 10, 2020

(51) Int. Cl.
| | |
|---|---|
| *A01M 7/00* | (2006.01) |
| *G08B 3/10* | (2006.01) |
| *B60Q 5/00* | (2006.01) |
| *G06F 3/0482* | (2013.01) |
| *G06F 3/0484* | (2022.01) |
| *G05D 1/02* | (2020.01) |
| *G06Q 50/02* | (2012.01) |

(52) U.S. Cl.
CPC ........... *A01M 7/0089* (2013.01); *B60Q 5/005* (2013.01); *G05D 1/0219* (2013.01); *G06F 3/0482* (2013.01); *G06F 3/0484* (2013.01); *G06Q 50/02* (2013.01); *G08B 3/10* (2013.01)

(58) Field of Classification Search
None
See application file for complete search history.

(56) References Cited

U.S. PATENT DOCUMENTS

| | | | |
|---|---|---|---|
| 9,667,710 B2 * | 5/2017 | Wilbur | H04L 67/12 |
| 2020/0053957 A1 * | 2/2020 | Rabby | G06F 16/29 |

OTHER PUBLICATIONS

Greenbook®, Crop and turf chemical reference guide, <https://www.greenbook.net/> (website launched in 1998).

* cited by examiner

*Primary Examiner* — Todd Melton
(74) *Attorney, Agent, or Firm* — MARSHALL, GERSTEIN & BORUN LLP; Randall G. Rueth

(57) ABSTRACT

A method for systematic application of agricultural products includes receiving a label, analyzing the label to generate procedures, receiving a product and field selection, generating a prescription including a map and the procedures, executing the procedures in the field, and displaying the map. A computing system includes a processor and a memory storing instructions that, when executed by the processor, cause the computing system to: receive a label, analyze the label to generate procedures, receive a product and field selection, generate a prescription including a map and the procedures, execute the procedures in the field, and display the map. A non-transitory computer readable medium stores program instructions that when executed, cause a computer to receive a label, analyze the label to generate procedures, receive a product and field selection, generate a prescription including a map and the procedures, execute the procedures in the field, and display the map.

20 Claims, 8 Drawing Sheets

200

> ACCEPTED
> 04/27/2015
> UNDER THE FEDERAL INSECTICIDE, FUNGICIDE AND RODENTICIDE ACT AS AMENDED, FOR THE PESTICIDE REGISTERED UNDER EPA REG. NO 264-600

RESTRICTED USE PESTICIDE

MAY INJURE (PHYTOTOXIC) SUSCEPTIBLE NON-TARGET PLANTS.
FOR RETAIL SALE TO AND USE ONLY BY CERTIFIED APPLICATORS OR PERSONS UNDER THEIR DIRECT SUPERVISION AND ONLY FOR THOSE USES COVERED BY THE CERTIFIED APPLICATOR'S CERTIFICATION. COMMERCIAL AND CERTIFIED APPLICATORS MUST ENSURE THAT ALL PERSONS INVOLVED IN THESE ACTIVITIES ARE INFORMED OF THE PRECAUTIONARY STATEMENTS.

| GROUP | 27 | HERBICIDE |
|---|---|---|

BALANCE® PRO HERBICIDE

ABN: SCOPARIA HERBICIDE

FOR WEED CONTROL IN FIELD CORN, SEED CORN AND CORN GROWN FOR SILAGE IN THE STATES OF: AR, AL, CO, DE, GA, IL, IN, IA, KS, KY, LA, MI, MN, MO, MS, MT, NE, NJ, NM, NC, ND, OH, OK, PA, SC, SD, TN, TX, VA, AND WY

IN THE STATES OF CO, DE, KS, MD, MO, NJ, NM, SD, AND WV USE IS ONLY ALLOWED UNDER 24C REGISTRATIONS. A CURRENT 24C LABEL MUST BE IN THE POSSESSION OF THE USER AT THE TIME OF THE PESTICIDE APPLICATION.

IN THE STATE OF MN USE IS ONLY ALLOWED IN ACCORDANCE WITH THE MINNESOTA PRODUCT BULLETIN.

ACTIVE INGREDIENT:

ISOXAFLUTOLE* [5-CYCLOPROPYL-4-(2-METHYLSULFONYL-4-TRIFLUOROMETHYLBENZOYL) ISOXAZOLE] .................................................................................................................. 40.5%

OTHER INGREDIENTS: ........................................................................................................... 59.5%

TOTAL: ................................................................................................................................. 100.00%

*PRODUCT CONTAINS 4.0 POUNDS OF ISOXAFLUTOLE PER GALLON.

EPA. REG. NO. 264-600                              E.P.A. EST. NO.

KEEP OUT OF REACH OF CHILDREN
CAUTION

SI USTED NO ENTIENDE LA ETIQUETA, BUSQUE A ALGUIEN PARA QUE SE LA EXPLIQUE A USTED EN DETALLE.(IF YOU DO NOT UNDERSTAND THE LABEL, FIND SOMEONE TO EXPLAIN IT TO YOU IN DETAIL.)

FOR MEDICAL AND TRANSPORTATION EMERGENCIES ONLY CALL 24 HOURS A DAY 1-800-334-7577 FOR PRODUCT USE INFORMATION CALL 1-866-99BAYER (1-866-992-2937)

FIG. 2

| | FIRST AID |
|---|---|
| IF SWALLOWED: | • IMMEDIATELY CALL A POISON CONTROL CENTER OR DOCTOR FOR TREATMENT ADVICE.<br>• DO NOT INDUCE VOMITING UNLESS TOLD TO DO SO BY A POISON CONTROL CENTER OR DOCTOR.<br>• HAVE PERSON SIP A GLASS OF WATER IF ABLE TO SWALLOW.<br>• DO NOT GIVE ANYTHING BY MOUTH TO AN UNCONSCIOUS PERSON. |
| IF ON SKIN OR CLOTHING: | • TAKE OFF CONTAMINATED CLOTHING.<br>• RINSE SKIN IMMEDIATELY WITH PLENTY OF WATER FOR 15-20 MINUTES.<br>• CALL A POISON CONTROL CENTER OR DOCTOR FOR TREATMENT ADVICE. |
| IF IN EYES: | • HOLD EYE OPEN AND RINSE SLOWLY AND GENTLY WITH WATER FOR 15-20 MINUTES.<br>• REMOVE CONTACT LENSES, IF PRESENT, AFTER THE FIRST 5 MINUTES, THEN CONTINUE RINSING.<br>• CALL A POISON CONTROL CENTER OR DOCTOR FOR TREATMENT ADVICE. |
| IF INHALED: | • MOVE PERSON TO FRESH AIR.<br>• IF PERSON IS NOT BREATHING, CALL 911 OR AN AMBULANCE, THEN GIVE ARTIFICIAL RESPIRATION, PREFERABLY MOUTH-TO-MOUTH IF POSSIBLE.<br>• CALL A POISON CONTROL CENTER OR DOCTOR FOR FURTHER TREATMENT ADVICE. |
| FOR MEDICAL EMERGENCIES CALL 24 HOURS A DAY 1-800-334-7577.<br>HAVE THE PRODUCT CONTAINER OR LABEL WITH YOU WHEN CALLING A POISON CONTROL CENTER OR DOCTOR OR GOING FOR TREATMENT. ||

NOTE TO PHYSICIAN: NO SPECIFIC ANTIDOTE IS AVAILABLE. ALL TREATMENTS SHOULD BE BASED ON OBSERVED SIGNS AND SYMPTOMS OF DISTRESS IN THE PATIENT. OVEREXPOSURE TO MATERIALS OTHER THAN THIS PRODUCT MAY HAVE OCCURRED.

FIG. 2 (CONTINUED)

AGRICULTURAL PRODUCT RECOMMENDATION METHODS AND SYSTEMS

TECHNICAL FIELD

The present disclosure is generally directed to methods and systems for agricultural product recommendations, and more specifically, for techniques for systematic application of crop protection and enhancement products.

BACKGROUND

Conventionally, growers seeking to apply agricultural treatments for crop protection/enhancement to their acres of land use products that include a variety of written application procedures. For example, a grower might purchase one or more pesticides (e.g., an herbicide, a fungicide, an insecticide, etc.) each including a respective set of written descriptions and/or procedures (i.e., a label) for the grower to follow, depending on various attributes of the grower's acreage and other factors. Conventional crop protection/enhancement labels are inherently complex and non-standardized documents that nevertheless include essential information for growers.

The purveyor of treatment products optimistically anticipates that each grower/agronomist/crop specialist will read, understand and successfully apply the oft-voluminous (e.g., hundreds of pages per product or more) written procedures to the grower's crops. In practice, however, treatment products may be misapplied, or applied inefficiently.

In addition to being non-standardized and voluminous, the written procedures released by product purveyors are unstructured. For example, in many cases, the written procedures are delivered to customers in paragraph form, such as PDF files including prose descriptions of the product. The same information may be expressed in different ways in by different product purveyors.

The sheer amount of information included in product labeling/written procedures for crop protection/enhancement products is overwhelming, especially to the grower who does not have access to a team of dedicated agronomists. Even for larger growing operations, keeping up with the labeling information, which is subject to change, is time consuming. Compliance with the information is another challenge entirely.

On top of the complexity, the penalties for failing to fully read and understand the labeling/application procedures and environmental requirements of crop protection/enhancement products can have devastating consequences to a grower. For example, misapplication can lead to crop loss (e.g., a reduction in yield or a mass die-out). Misapplication can also lead to civil and/or criminal liability due to personal injury and/or natural resource contamination.

Conventional crop enhancement/protection labeling may include aggregating services (e.g., Greenbook). Greenbook provides an index of agricultural labels gathered from one or more individual product purveyors. A user may manually search Greenbook for label information. However, the search results merely return label information (e.g., in PDF form) that the grower must read and interpret. Moreover, labels merely provide blanket recommendations for growers. In other words, even if the grower follows the label procedures perfectly, the grower's crop may still fall significantly short of its potential.

In sum, growers have a strong interest in substantial compliance with the procedures associated with product labeling, but conventional techniques are inadequate.

BRIEF SUMMARY

In one aspect, a computer-implemented method for systematic application of a protection/enhancement product includes receiving, via one or more processors, a label corresponding to the crop protection/enhancement product, analyzing the label to generate a set of one or more machine-readable procedures, receiving, via a graphical user interface, a user selection indicating (i) the protection/enhancement product and (ii) one or more fields, generating, via one or more processors, an electronic prescription object including one or more map layers and the set of one or more machine-readable procedures, executing the one or more machine-readable procedures with respect to the one or more fields; and causing the one or more map layers to be displayed in a client computing device.

In another aspect, a computing system includes a processor and a memory storing instructions that, when executed by the processor, cause the computing system to receive, via one or more processors, a label corresponding to the crop protection/enhancement product, analyze the label to generate a set of one or more machine-readable procedures, receive, via a graphical user interface, a user selection indicating (i) the protection/enhancement product and (ii) one or more fields, generate, via one or more processors, an electronic prescription object including one or more map layers and the set of one or more machine-readable procedures, execute the one or more machine-readable procedures with respect to the one or more fields; and cause the one or more map layers to be displayed in a client computing device.

In yet another aspect, a computing system includes a processor and a memory storing instructions that, when executed by the processor, cause the computing system to receive, via one or more processors, a label corresponding to the crop protection/enhancement product, analyze the label to generate a set of one or more machine-readable procedures, receive, via a graphical user interface, a user selection indicating (i) the protection/enhancement product and (ii) one or more fields, generate, via one or more processors, an electronic prescription object including one or more map layers and the set of one or more machine-readable procedures, execute the one or more machine-readable procedures with respect to the one or more fields; and cause the one or more map layers to be displayed in a client computing device.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 depicts an exemplary crop protection and enhancement label, according to one embodiment and scenario.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview

The embodiments described herein relate to, inter alia, methods and systems for agricultural product recommendations, and more specifically, techniques for the systematic application of crop protection and enhancement products. In some embodiments, the present techniques include methods and systems for extracting label information to generate machine-readable label procedures, generating agricultural prescriptions that include the label procedures, and delivery/execution of the agricultural prescriptions in implements. In some embodiments, the present techniques include methods and systems for visualizing the extracted label information.

Exemplary Computing Environment

Figure 1:
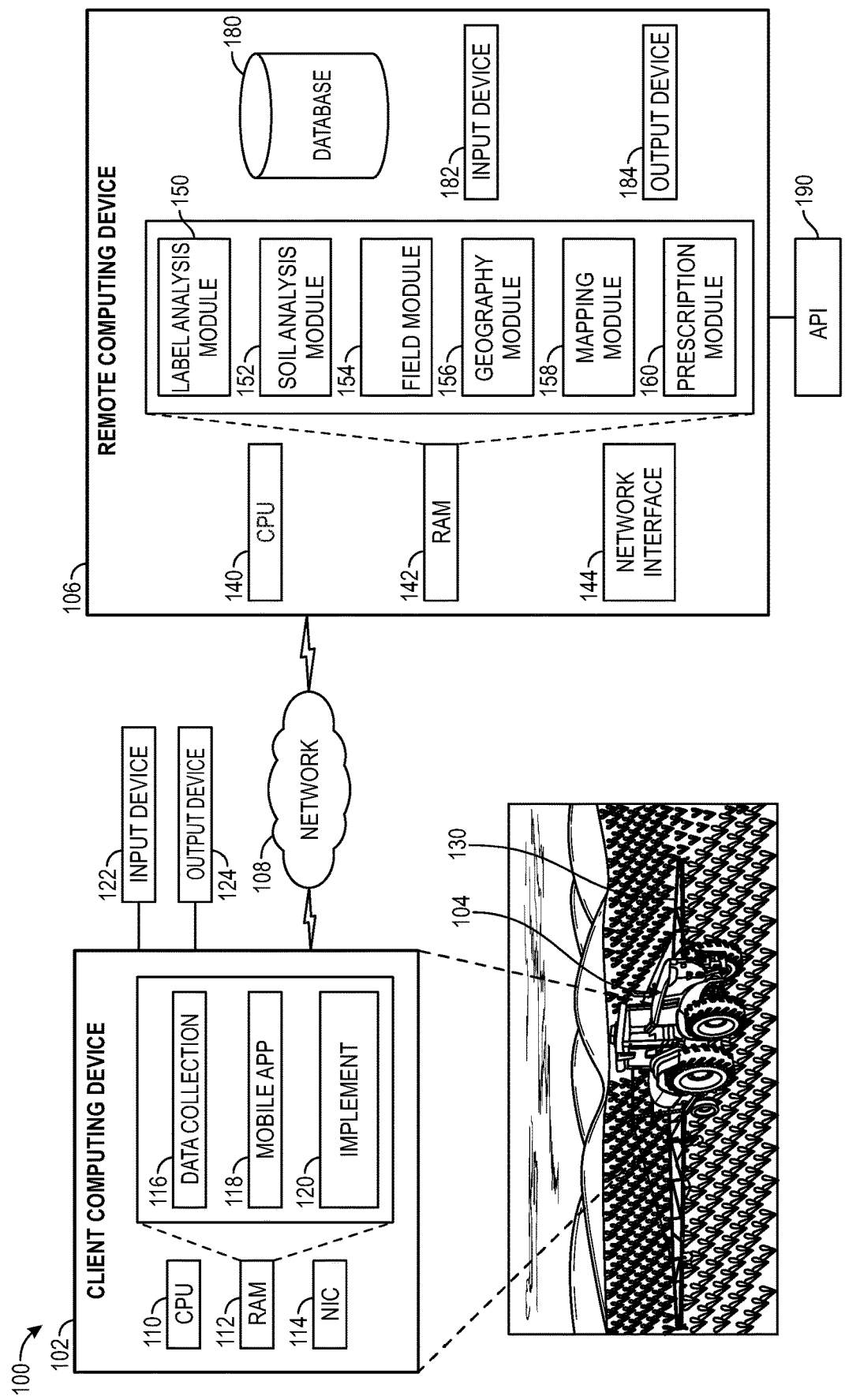
FIG. 1 depicts an exemplary computing environment for implementing systematic application of crop protection and enhancement products, according to an embodiment.

FIG. 1 depicts an exemplary computing environment 100 in which the techniques disclosed herein may be implemented, according to an embodiment. The environment 100 includes a client computing device 102, an implement 104, a remote computing device 106, and a network 108. Some embodiments may include a plurality of client computing devices 102, a plurality of implements 104, and/or a plurality of remote computing devices 106. Multiple and/or separate networks may communicatively couple different components, such as the client computing device 102 and the implement 104, and/or the client computing device 102 and the remote computing device 106.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. In some embodiments the client computing device 102 may be temporarily or permanently affixed to the implement 102. For example, the client computing device 102 may be the property of a customer, an agricultural analytics (or "agrilytics") company, an implement manufacturer, etc.

The client computing device 102 includes a processor 110, a memory 112 and a network interface controller (NIC) 114. The processor 110 may include any suitable number of processors and/or processor types, such as CPUs and one or more graphics processing units (GPUs). Generally, the processor 110 is configured to execute software instructions stored in a memory 112. The memory 112 may include one or more persistent memories (e.g., a hard drive/solid state memory) and stores one or more set of computer executable instructions/modules, including a data processing module 116, a mobile application module 118, and an implement control module 120, as described in more detail below. More or fewer modules may be included in some embodiments. The NIC 114 may include any suitable network interface controller(s), such as wired/wireless controllers (e.g., Ethernet controllers), and facilitate bidirectional/multiplexed networking over the network 108 between the client computing device 102 and other components of the environment 100 (e.g., another client computing device 102, the implement 104, the remote computing device 106, etc.).

The one or more modules stored in the memory 112 may include respective sets of computer-executable instructions implementing specific functionality. For example, in an embodiment, the data collection processing 116 includes a set of computer-executable instructions for receiving data from the implement 104 and/or the remote computing device 106. The data collection processing 116 may further include a set of computer-executable instructions for transmitting data to the implement 104 and/or for transmitting data to the remote computing device 106.

The data processing module 116 may include a respective set of instructions for retrieving/receiving data from a plurality of different implements. For example, a first set of instructions may be for retrieving/receiving machine data from a first tractor manufacturer, while a second set of instructions is for retrieving/receiving machine data from a second tractor manufacturer. In another embodiment, the first and second set of instructions may be for, respectively, receiving/retrieving data from tillage equipment and a harvester. Of course, some libraries of instructions may be provided by the manufacturers of various implements and/or attachments, and may be loaded into the memory 112 and used by the data collection module 116. The data processing module 116 may retrieve/receive machine data from a separate hardware device (e.g., a client computing device 102 that is part of the implement 104) or directly from one or more of the sensors of the implement 104 and/or one or more of the attachments 130 coupled to the implement 104, if any.

The data processing module 116 may receive map data from, for example, the mapping module 158 of the remote computing device 106. The mapping data may include one or more map layers corresponding to an agricultural field.

The machine data may include any information generated by the client computing device 102, the implement 104, and/or the attachments 130. For example, the machine data may include sensor measurements of engine load data, fuel burn data, draft, fuel consumption, wheel slippage, etc. The machine data may include one or more nozzle spray rates, one or more tank levels, etc. The machine data may include one or more time series, such that one or more measured values are represented in a single data set at a common interval (e.g., one-second). For example, the machine data may include a first time series of draft at a one-second interval, a second time series of wheel slippage, etc. The machine data is location-aware. For example, the client computing device 102 may add location metadata to the machine data, such that the machine data reflects an absolute and/or relative geographical position (i.e., location, coordinate, offset, heading, etc.) of the client computing device 102, the implement 104, and/or the attachments 130 within the agricultural field at the precise moment that the client computing device 102 captures the machine data. The client computing device 102 may determine its location by reference to a Global Positioning System (GPS) module (not depicted).

It will also be appreciated by those of ordinary skill in the art that some sensors and/or agricultural equipment may generate machine data that is received by the client computing device 102 and includes location metadata added by the sensors and/or agricultural equipment. In an embodiment wherein the machine data comprises a time series, each value of the time series may include a respective geographic metadata entry.

The data processing module 116 may receive and/or retrieve the machine data from the implement 104 (e.g., via an API) through a direct hardware interface (e.g., via one or more wires) and/or via a network interface (e.g., via the network 108). The data processing module 116 may collect (e.g., pull the machine data from a data source and/or receive machine data pushed by a data source) at a predetermined time interval. The time interval may be of any suitable duration (e.g., once per second, once or twice per minute, every 10 minutes, etc.). The time interval may be short, in some embodiments (e.g., once every 10 milliseconds). The data processing module 116 may include instructions for modifying and/or storing the machine data. For example, the data processing module 116 may parse the raw machine data into a data structure. The data processing module 116 may write the raw machine data onto a disk (e.g., a hard drive in the memory 112). In some embodiments, the data processing module 116 may transfer the raw machine data, or modified machine data, to a remote computing system/device, such as the remote computing device 106. The transfer may, in some embodiments, take the form of an SQL insert command. In effect, the data processing module 116 performs the function of receiving, processing, storing, and/or transmitting the machine data.

The mobile application module 118 may include computer-executable instructions that display one or more graphical user interfaces (GUIs) on the output device 124 and/or receives user input via the input device 122. For example, the mobile application module 118 may correspond to a mobile computing application (e.g., an Android, iPhone, or other) computing application of an agrilytics company. The mobile computing application may be a specialized application corresponding to the type of computing device embodied by the client computing device 102. For example, in embodiments where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with the user may interact, are discussed below. The mobile application module 118 may include instructions for receiving/retrieving mobile application data from the remote computing device 106. In particular, the mobile application module 118 may include instructions for transmitting user-provided login credentials, receiving an indication of successful/unsuccessful authentication, and other functions related to the user's operation of the mobile application. The mobile application module 118 may receive user input for controlling the implement 120 and/or one or more attachments 130. For example, in an embodiment, the user may input an input via the input device that causes a valve of a sprayer attachment 130 to open or close.

The mobile application module 118 may include instructions for receiving/retrieving, rendering, and displaying visual maps in a GUI. Specifically, the application module 118 may include computer-executable instructions for displaying one or more map layers in the of the client computing device 102. For example, the map layers may depict one or more paths of the implement 130. The map layers may annotate the paths using a suitable graphical indicator, or visualization, corresponding to the application of an agricultural product. For example, the paths may be colored red in areas where a grower and/or custom applicator is not to apply the agricultural product. The mobile application module 118 may depict, in the mobile application 118, a location of the implement 104. The location may be displayed within, or superimposed over, a map layer such that the user (e.g., an employee of the agrilytics company, a grower, an implement operator, etc.) may view the location of the implement in relation to the paths. In some embodiments, the paths and/or other visual indicators may indicate that a particular agricultural product should not be applied in a certain area. For example, within a particular proximity to a road, a water body, etc. The indicators may correspond to a gradient.

The implement control module 120 includes computer-executable instructions for controlling the operation an implement (e.g., the implement 104) and/or the attachments 130. The implement control module 120 may control the implement 104 while the implement 104 and/or attachments 130 are in motion (e.g., while the implement 104 and/or attachments 130 are being used in a farming capacity). For example, the implement control module 120 may include an instruction that, when executed by the processor 110 of the client computing device 102, causes the implement 104 to accelerate, decelerate, and/or turn. In some embodiments, the implement control module 120 may cause one of the attachments 130 to open a value of the sprayer, or to direct the sprayer to dispense a fluid from one or more tanks. The implement control module 120 may control the dispensing of solid matter, such as seed, fertilizer, solid crop treatments, etc.

Practically, the implement control module 120 has all of the control of the implement 104 and/or attachments 130 as does the human operator. The implement control module 120 may include a respective set of instructions for controlling a plurality of implements. For example, a first set of instructions may be for controlling an implement of a first tractor manufacturer, while a second set of instructions is for controlling an implement of a second tractor manufacturer. In another embodiment, the first and second set of instructions may be for, respectively, controlling tillage equipment and a harvester. Of course, many configurations and uses are envisioned beyond those provided by way of example.

The control module 120 may include computer-executable instructions for receiving and/or executing one or more agricultural prescriptions with respect to a field. The prescription may be an electronic object including executable instructions for performing label-specific procedures for one or both of (i) protecting/enhancing a crop within the field by applying an agricultural product, and (ii) avoiding environmental damage to the field.

For example, the control module 120 may execute an agricultural prescription that specifies, for a given agricultural field, the path for the implement 104 to follow within the field, and an varying application rate of a chemical (e.g., a fertilizer, an herbicide, a pesticide, etc.) or a seed to apply at various points along the path. The control module 120 may analyze the current location of the implement 104 and/or the attachments 130 in real-time (i.e., as the control module 120 executes the agricultural prescription). The implement control module 120 may perform certain actions based on analyzing one or more map layers. For example, the implement control module 120 may include instructions for analyzing a first map layer including one or more groundwater well locations, a second map layer including one or more field boundaries, a third map layer including one or more paths, etc.

In some embodiments, one or more components of the computing device 102 may be embodied by one or more virtual instances (e.g., a cloud-based virtualization service). In such cases, one or more client computing devices 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 108 with the implement 104 and/or the attachment 130 that may be coupled to the implement 104. The implement 104 and/or the attachments 130 may be configured for bidirectional communication with the client computing device 102 via the network 108.

The client computing device 102 may receive/retrieve data (e.g., machine data) from the implement 104, and/or the client computing device 102 may transmit data (e.g., instructions) to the implement 104. The client computing device 102 may receive/retrieve data (e.g., machine data) from the attachments 130, and/or may transmit data (e.g., instructions) to the attachments 130. The implement 104 and the attachments 130 will now be described in further detail.

The implement 104 may be any suitable powered or unpowered equipment/machine or machinery, including without limitation: a tractor, a combine, a cultivator, a cultipacker, a plow, a harrow, a stripper, a tiller, a planter, a baler, a sprayer, an irrigator, a sorter, an harvester, etc. The implement 104 may include one or more sensors (not depicted) and the implement 104 may be coupled to one or more attachments 130. For example, the implement 104 may include one or more sensors for measuring respective implement values of spray rate, engine load data, fuel burn data, draft sensing, fuel consumption, wheel slippage, etc. Many embodiments including more or fewer sensors measuring more or fewer implement values are envisioned. The implement 104 may be a gas/diesel, electric, or hybrid vehicle operated by a human operator and/or autonomously (e.g., as an autonomous/driverless agricultural vehicle).

The attachments 130 may be any suitable powered or unpowered equipment/machinery permanently or temporarily affixed/attached to the implement 104 by, for example, a hitch, yoke or other suitable mechanism. The attachments 130 may include any of the types of equipment that the implement 104 may comprise (e.g., tillage equipment, planting equipment, etc.). The attachments 130 may include one or more sensors (not depicted) that may differ in number and/or type according to the respective type of the attachments 130 and the particular embodiment/scenario. For example, tillage equipment attachment 120 may include one or more soil depth sensors. A sprayer attachment 120 may include one or more tank level sensors. It should be appreciated that many attachments 130 sensor configurations are envisioned. For example, the attachments 130 may include one or more cameras. The attachments 130 may include a control module for controlling agitation of one or more tanks. The attachments 130 may be connected to the implement 104 via wires or wirelessly, for both control and communications. For example, attachments 130 may be coupled to the client computing device 102 of the implement 104 via a wired and/or wireless interface for data transmission (e.g., 4G or 5G cellular, IEEE 802.11, WiFi, etc.) and main/auxiliary control (e.g., 7-pin, 4-pin, etc.). The client computing device 102 may communicate bidirectionally (i.e., transmit data to, and/or receive data from) with the remote computing device 106 via the network 108.

The client computing device 102 includes an input device 122 and an output device 124. The input device 122 may include any suitable device or devices for receiving input, such as one or more microphones, one or more cameras, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an agrilytics company.

The network 108 may be a single communication network, or may include multiple communication networks of one or more types (e.g., one or more wired and/or wireless local area networks (LANs), and/or one or more wired and/or wireless wide area networks (WANs) such as the Internet). The network 108 may enable bidirectional communication between the client computing device 102 and the remote computing device 106, or between multiple client computing devices 102, for example.

The remote computing device 106 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 106 may include a label analysis module 150, a soil analysis module 152, a field module 154, a geography module 156, a mapping module 158 and a prescription module 160. The NIC 144 may include any suitable network interface controller(s), such as wired/wireless controllers (e.g., Ethernet controllers), and facilitate bidirectional/multiplexed networking over the network 108 between the remote computing device 106 and other components of the environment 100 (e.g., another remote computing device 106, the client computing device 102, etc.).

The one or more modules stored in the memory 142 may include respective sets of computer-executable instructions implementing specific functionality.

For example, the label analysis module 150 may retrieve/receive label information corresponding to one or more agricultural crop protection and/or enhancement products. An exemplary label is discussed below. The label analysis module 150 may generate machine-readable label procedures by analyzing the label information. In some embodiments, the label analysis module 150 may include instructions for automatically collecting label information from one or more human users. In some embodiments, the human users may input the label information via the input device 122 of the client computing device 102. More than one human users may simultaneously input such label information into one or more respective client computing devices 102.

In some embodiments, the label analysis module 150 may generate machine-readable label procedures by analyzing the label information using a set of computer-executable instructions, such as regular expressions, a machine learning model trained to extract label information, etc. In some embodiments, one or more humans may be hired to manually extract information from the labels.

The machine-readable procedures may include machine-readable attributes. For example, the name, chemical formula and composition of the chemical compound(s) contained within the labeled product may be an attribute of the procedures. The label analysis module 150 may include instructions for scrubbing data, for example, for removing extraneous information, for normalizing strings, etc.

The machine-readable procedures may be an executable script, or program, of instructions with respect to an agricultural crop protection and/or enhancement product. In an embodiment, the machine-readable procedures may include a conditional expression relative to one or more physical objects, such as the implement 104 and/or map features. For example, the machine-readable procedures may include conditional statements, expressions and the like. For example, the procedures may include a conditional expression such as "if map.water.proximity<=100 meters, sprayers (ALL).disable". An administrative user may define machine-readable procedures manually, in some embodiments. The procedures may be expressed in any suitable programming language (e.g., the R programming language). By authoring procedures and/or generating procedures by analyzing the label information, the administrative user is able to advantageously encapsulate logic and/or business rules to avoid over-application of crop protection/enhancement products, as well as environmental damage. The label analysis module 150 may store the label information and/or machine-readable label procedures in an electronic database such as the database 180.

The soil analysis module 152 may analyze information received from the label analysis module 150 to determine a set of distinct procedures based on soil physical properties. For example, chemistries used in current growing practices include an environmental component that is often based on the level of organic matter (OM) of a given field. The soil analysis module 152 may include computer-executable instructions for generating procedures based on soil attributes included in the label information. For example, the soil analysis module 152 may include instructions for determining that a given OM level, or range, corresponds to an application rate provided within label information. The soil analysis module 152 may store such determinations in the electronic database 180. The soil analysis module 152 may include instructions for analyzing data received from the implement 104 to determine soil physical properties. When the soil textural properties correspond to a predetermined type (e.g., beach sand, clay, etc.) the soil analysis module 152 may associate data with a particular field, e.g., via the field module 154. The soil analysis module 152 may vary machine-readable procedures associated with the field based on the determined soil physical properties.

The field module 154 may include computer-executable instructions for analyzing one or more agricultural fields. For example, a grower may farm the one or more fields. The grower may be a customer or client of the agrilytics company, and may hire the agrilytics company to manage certain aspects of the grower's fields. In one embodiment, the grower may access an instance of the client computing device 102 to enter information about the grower's fields via the field module 154. For example, for a field of the grower, the field module 154 may include instructions for receiving an identifier of the field, a name of the field, coordinates corresponding to the field, one or more maps corresponding to the field including field boundaries, etc. The field module 154 may store received information corresponding to the field in the database 180, in a respective electronic field record. The electronic field record may be associated with one or more soil physical properties in the soil analysis module 152. The soil analysis module 152 may associate one or more soil physical properties with one or more respective regions of the field.

The user may define one or more field objects and associate the objects with the field via a mapping user interface that may be displayed in the mobile application module 118, in some embodiments. For example, the user may define a road, a waterway, a pond, a drainage area, a runoff area, a groundwater well, an adjacent crop, etc. The field module 154 may gather elevation data from public sources, such as the United States Geological Survey (USGS) National Elevation Dataset (NED) database or LiDAR data available via state/county geospatial data clearinghouses. In some embodiments, the field module 154 may receive raw data from the data collection module 116, and infer the elevation of a particular plot of land by analyzing the raw data. The elevation data may be stored in a two-dimensional (2D) or three-dimensional (3D) data format, depending on the embodiment and scenario. The elevation data may be analyzed by other modules, such as the geography module 156.

The geography module 156 may include computer-executable instructions for determining machine-readable instructions based on field geography. The geography module 156 may adjust machine-readable procedures generated by other modules (e.g., the label analysis module 150) to account for such geographic features. For example, some more northerly geographies are known to include soil having higher concentrations of OM due to geologic phenomena. Consequently, some agricultural products may generally recommend a particular rate of application. Yet the geography module 156 may adjust such rates of application by analyzing historical data collected at particular latitudes that demonstrates slower than normal absorption, precipitation patterns, a different growing season and/or restrictions on crop rotation. The administrative user may configure the geography module 156 to encapsulate such information using any suitable marker (e.g., by U.S. state, by region, by latitude/longitude, highways, rivers, using map layers, etc.).

The mapping module 158 includes computer-executable instructions for performing map-related functions. For example, the mapping module 158 may include instructions for generating one or more map layers and/or one or more geospatial data files (e.g., shapefiles, raster layers). The mapping module 158 may store the generated map layers and/or geospatial files in the database 180, or in the memory 142. The mapping module 158 may provide the geospatial files and/or map layers to other components of the environment 100, such as the client computing device 102. Specifically, the mapping module 158 may include an API endpoint that allows the mobile application module 118 to submit a query/request to receive/retrieve one or more geospatial files and/or one or more map layers via the network 108. It will be appreciated by those of ordinary skill in the art that the mapping module 158 may use existing standardized and/or proprietary software libraries to generate the maps and/or shapefiles. Further, the mapping module 158 may combine one or more data sets from the database 180 into a single map layer/geospatial file, or into multiple respective map layers. For example, the mapping module 156 may generate a composite geospatial data file that includes a first map layer representing an agricultural field object as defined using the field module 154. A second map layer may represent portions of the agricultural field wherein differences in elevation are indicated using distinct colors, patterns or other suitable visual cues.

In one embodiment, the prescription module 160 may combine information from the label analysis module 150, the soil analysis module 152, the field module 154, the geography module 156, and the mapping module 158 to generate a machine-readable agricultural prescription. For example, the prescription module may receive a request to generate a prescription for a grower's field, for herbicidal application using a particular agricultural product.

The prescription module 160 may create an electronic prescription object in the memory 142 and/or the database 180. The prescription module 160 may add one or more machine-readable procedures generated by the label analysis module 150 to the prescription object. The prescription module 160 may adjust the machine-readable procedures using information received from the soil analysis module 152. For example, when a portion of the soil of the field is loamy, the prescription module 160 may set a soil property variable and/or an application rate of a corresponding portion of a path of the electronic prescription object, as discussed below with respect to FIG. 4.

The prescription module 160 may add information received from the field module 154 relating to one or more fields to the electronic prescription object. The prescription module 160 may adjust the electronic prescription object based on information received/retrieved from the geography module 156. The prescription module 160 may mapping information (e.g., one or more map layers) received/retrieved from the mapping module 158 to the prescription object. The prescription module 160 may transmit the electronic prescription object to a remote computing device (e.g., the client computing device 102).

In some embodiments, the soil analysis module 152 may analyze information from a third-party database (e.g., the SSURGO database of the National Resources Conservation Service (NRCS)). Information that may be obtained from NRCS databases may include large scale (e.g., countrywide) soil survey including organic matter, soil texture, pH, cation-exchange capacity (CEC), sand/soil/clay characterizations, etc. In still further embodiments, the agrilytics company may supplant and/or supplement the NRCS data with data of finer detail. Such finer data may be collected via a soil probe, for example, and may be stored in the database 180.

The mapping module 158 may create one or more paths by cross-referencing one or more soil data measures (e.g., OM and texture) with field boundaries retrieved from the field module 154. The paths may include a set of application rates each corresponding to a respective geographic point within the field boundary, wherein the application rates are based on those listed in the label information. In effect, the paths may be used to determine the application rate of the product that should be applied at each point. Such imperative knowledge may be encoded for the user's viewing by visually marking (e.g., via use of color or pattern) the application rates of the paths using color. For example, the mapping module 158 may include instructions for marking rates less than value R with red color and values >=R with green color, wherein red corresponds to a lower rate of flow and green corresponds to a higher rate of flow.

In this way, the user may determine in real time the application rate that the automated implement 104 is ostensibly applying. Such visual feedback advantageously assists the user in spotting malfunctioning automated equipment, and enables the user to spot issues before they occur. For example, the user may preemptively anticipate an empty tank based on the amount of green path remaining on a display screen. It should be appreciated that other visual indicators may be used. For example, in some embodiments, a third color (e.g., yellow) may be used to represent an area of lower rate flow, and the red color may be used to represent areas of zero flow. As noted, the present techniques assist the user in avoiding environmental hazards. The real-time visualizations discussed above assist users who are not able to react and accurately gauge distances (e.g., 100 m). Furthermore, the present techniques assist the user in spotting latent soil variability. For example, a field having a black topsoil layer may appear to be of a uniform soil makeup. The present techniques permit the user to see that which is unseen, namely latent soil characteristics beneath the soil surface.

The remote computing device 106 may further include one or more databases 180, an input device 182, an output device 184 and an application programming interface (API) 190. The database 180 may be implemented as a relational database management system (RDBMS) in some embodiments. For example, the data store 140 may include one or more structured query language (SQL) databases, a NoSQL database, a flat file storage system, or any other suitable data storage system/configuration. In general, the database 180 allows the client computing device 102 and/or the remote computing device 106 to create, retrieve, update, and/or retrieve records relating to performance of the techniques herein. For example, the database 180 may allow the client computing device 102 to store information received from one or more sensors of the implement 104 and/or the attachments 140. The client computing device 102 may include a module (not depicted) including a set of instructions for querying an RDBMS For example, the client computing device 102 may include a set of database drivers for accessing the database 180 of the remote computing device 106. In some embodiments, the database 180 may be located remotely from the remote computing device 104, in which case the remote computing device 104 may access the database 180 via the NIC 112 and the network 108.

The database 180 may use foreign keys to maintain relations between tables. For example, the database 180 may include a product manufacturer table and a product table. Each product may include a foreign key to a manufacturer. In this way, the products belonging to a certain manufacturer may be queried, and vice versa. The database 180 may include a category table including, for example, labels, pest types, crop types, product type, manufacturers, etc. Each category may be associated with one or more other categories through the use of foreign keys. Multi-level categories may be defined.

The input device 182 may include any suitable device or devices for receiving input, such as one or more microphones, one or more cameras, a hardware keyboard, a hardware mouse, a capacitive touch screen, etc. The input device 182 may allow a user (e.g., a system administrator) to enter commands and/or input into the remote computing device 106, and to view the result of any such commands/input in the output device 184.

The output device 184 may include any suitable device for conveying output, such as a hardware speaker, a computer monitor, a touch screen, etc. The remote computing device 106 may be associated with (e.g., leased, owned, and/or operated by) an agrilytics company. As noted above, the remote computing device 106 may be implemented using one or more virtualization and/or cloud computing services.

The API 190 may provide users with access to resources of the remote computing device 106. For example, in some embodiments, the API 190 enables a grower to retrieve/receive a prescription generated by the prescription module 160. The API 190 may include computer-executable instructions for processing one or more requests (e.g., an HTTP request) from the user's device (e.g., from an instance of the client computing device 102) and/or for transmitting (e.g., via the network 108) one or more responses (e.g., an HTTP response) to the user's device. The responses to the client may include information based on the requests. For example, the API 190 may return a data set retrieved from the database 180, wherein the data set corresponds to a parameter included in the user's request. The API 190 may include security and/or access control features. In some embodiments, an agronomist (e.g., an employee of the agrilytics company) may access the API 190 to retrieve information corresponding to an agricultural field. In some embodiments, the purveyor of the remote computing device 106 (e.g., the agrilytics company) may license use of the API 190 to third parties. The API 190 may support different access levels for different users. For example, the agronomist user and third party may access different data within the database 180. In some embodiments, the agronomist may have access to all map data generated by the mapping module 158 associated with any field identified by the field module 154, whereas the third party user's access is limited to only those maps associated with a subset of one or more fields.

The environment 100, including the API 190, represents a significant advantageous improvement over conventional label information systems. Specifically, the label analysis module 150 performs the difficult work of aggregating and systematizing unstructured label information. The soil analysis module 152, field module 154, geography module 156 and mapping module 158 provide a coherent model of real-world agricultural land acres. The prescription module 160 generates executable prescriptions that may be used to programmatically control farm implements like the implement 104 in a way that respects written procedures for optimizing crop enhancement and protection, and for avoiding environmental damage.

In operation, a GUI of an application (e.g., the mobile app 118) may include instructions for displaying a list of one or more agricultural fields corresponding to the user. Each field may include an identifier/name. The application may receive a list of fields from the field module 154, for example. The list of fields may include respective attributes (e.g., a soil type, a geography, one or more map layers, etc.) retrieved from another module (e.g., the soil analysis module 152, the geography module 156, the mapping module 158, etc.).

The GUI may include further instructions for displaying a list of one or more agricultural products. The one or more agricultural products may include one or more default label-specific procedures extracted (e.g., by the label analysis module 150) from the labels corresponding respectively to the one or more agricultural products. In some embodiments, the user may adjust default label-specific procedures and field information, e.g., via additional user interface elements (not depicted). For example, the user may use the additional user interface elements to modify the field boundaries, edit the field paths, modify the soil type, etc.

The GUI may cause an HTTP request to be transmitted from the client computing device 102 to the remote computing device 106 (e.g., in response to a selection of the user). The request may include an indication of the selected fields and the selected products. The prescription module 160 of the remote computing device may receive the indication of the selected one or more fields and the selected one or more products. For each field and product combination, the prescription module 160 may generate a respective electronic prescription object and transmit the generated respective prescription object to an implement (e.g., the implement 104, an instance of the client computing device 102). As discussed above, the prescription object may include wherein each the respective prescription object includes an indication of a field and one or more machine-readable procedures. The implement may execute the one or more prescriptions by performing the procedures (e.g., while driving the field) sequentially or in parallel. In some embodiments, the implement may display corresponding portions of the prescription object corresponding to visualizations (e.g., a GUI including one or more map layers) while performing the procedures.

In some embodiments, the client computing device 102 may cause an user/alarm notification to be output, for example, when the user operates the implement 104 in a manner that is inconsistent with the machine-readable procedures. For example, the output device 124 of the client computing device 102 may implement a speaker that sounds an alarm tone when the user attempts to over-apply a crop treatment. In other embodiments, the prescription may include instructions that cause the implement 104 to perform other actions in response to other conditions. For example, the prescription may cause one or more valves in the attachment 130 to close when the implement is within a predetermined proximity (e.g., 50 m) of a groundwater well.

In some embodiments, the alarm notification may be generated by a decision support tool (not depicted). The decision support tool may be, for example, a module including a set of instructions in the client computing device 102 that generates alarms to assist the grower/operator in determining when to apply or not apply the crop protection product to a field. For example, the decision support tool may generate a first alarm notification when the grower should begin application of the crop protection product, and a second alarm notification when the grower should cease application of the crop protection product. The decision support tool may generate alarm notifications in advance of a decision point (e.g., the decision support tool may generate an alarm instructing the grower/operator to, "stop application at the next turn."). The decision support tool may generate notifications by analyzing the machine data, mapping data, etc.

In still further embodiments, the environment 100 may operate in an offline mode. In other words, rather than transmitting a prescription for immediate execution by the implement 104, the remote computing device 106 may transmit a notification to the user. For example, a notifications module (not depicted) of the remote computing device 106 may analyze the procedures of the prescription and generate recommendations. The notification may take the form of an email, a push message, or any other suitable electronic communication. An example of a notification follows: "Do not apply product X on field Q. It has a low OM concentration and is dominated by coarsely-textured soils. Crop injury is likely to occur." In some embodiments, the notification may include the one or more map layers including the path annotated with visual cues, as discussed above. Therefore, the present techniques further advantageously benefit the operation of the farm by helping growers and others (e.g., an agronomist) to make informed decisions regarding fields.

Exemplary Crop Protection & Enhancement Label

FIG. 2 depicts an exemplary crop protection and enhancement label 200. The label 200 is representative of conventional product labels that, as noted above, are inherently complex and non-standardized documents. The label 200 relates to Balance Pro Herbicide, purveyed by Bayer CropScience (see EPA registration number 264-600). The label 200 is exemplary of existing complexity of product labeling, and issues faced by growers. The label 200 may correspond to a treatment product such as a pesticide, an herbicide, a fungicide, etc.

The label 200 may include written procedures directed to certain field attributes. For example, the field attributes may include respective procedures for different crop planting stages (e.g., early preplant, preplant, etc.), different soil OM concentrations (e.g., less than 1.5% OM, greater than 1.5% OM, etc.), different soil texture properties (e.g., coarse, medium, fine, etc.) and so forth.

The label 200 including the written procedures may be subject to regulatory approval/definition by, for example, the United States Environmental Protection Agency (EPA) under federal and/or state law (e.g., some products are regulated under the Federal Insecticide, Fungicide and Rodenticide Act). Once approved by the regulator, the purveyor of the crop enhancement/protection product may publish the label and generally does so in an electronic format such as a PDF file.

For example, the label 200 includes the following information: chemical group information, a list of active ingredients (e.g., isoxaflutole), EPA registration number and a warning to keep out of the reach of children. The label 200 may further include contact information for the purveyor, and detailed first aid information for accidental ingestion, contact and inhalation. The label 200 may further include detailed information regarding personal protective information to be worn by those in contact with the chemicals referred by the label 200, and general user safety recommendations (e.g., procedures related to hand washing, avoiding eating and/or drinking, and cleansing).

In addition to general precautionary information, the label 200 may further include a detailed list of environmental hazards to be heeded by those applying the chemicals, including: avoiding drift/runoff, avoiding over-application to leaching/loamy soils, avoiding wet or poorly draining soils, avoiding application to areas with regions that slope to waterways, avoiding canals or ditches that drain to surface water, etc. The list of environmental hazards may further include information relating to toxicity at low concentrations to non-target plants. For example, the written procedures of the label 200 may caution that one of the constituent chemicals (e.g., isoxaflutole) is highly toxic to cotton plants.

In addition to runoff/draining warnings, the list of environmental hazards contained in the label 200 may include setback procedures. For example, the setback procedures may stipulate that the product may not be mixed, loaded, rinsed and/or washed within 50 feet of any well, sink hole, stream/river, lake/reservoir, etc. The setback procedures may include exceptions. For example, the setback procedures may include exceptions for situations wherein an abandoned well is capped, and/or when a mixing/loading area is guarded by an impervious pad and/or is diked for the purpose of avoiding drift/runoff. The setback procedures may specify the properties of an allowable impervious pad (e.g., a pad must be no smaller than 110% of the capacity of the largest container or application equipment).

In general, the environmental hazard product information for pesticide labels such as the label 200 may be followed by application procedures. For many products including herbicides, fungicides, etc., the product information may include procedures relating to resistance management, in particular, the label 200 may caution that the repeated use of the product may allow resistance to develop. The resistance management procedures may include specific written procedures specifying periodic required rotation to avoid resistance from developing. The application procedures may further include mixing procedures, including detailing volumetric water measurements, liquid fertilizer and/or product ratios.

The label 200 may include a step-by-step procedure for adding water, herbicide, mixing, and agitation. The mixing procedures may specify, for example, that continued agitation during application is necessary to ensure a uniform spray mixture. The application procedures may specify a time period after which re-agitation is necessary to avoid settling out of solid matter in suspension. Of course, the time period may differ from product to product. The application procedures contained in the label 200 may include yet further tank mixture procedures discussing whether and to what extent the chemicals described by the label 200 may be combined with other substances, and procedures for testing such combinations on crops prior to more general application.

The application procedures may include timing information that may vary. For example, as noted, the label 200 may include preplant procedures for applying the product when a crop is in a preemergence state, and cautioning against application after a crop has emerged. The timing information may discuss applying the product when precipitation is expected within a predetermined time period after application (e.g., within 14 days). The timing instructions may provide further timing-specific application procedures including but not limited to preplant surface-applied application procedures, preplant incorporated application procedures, preplant/preemerge burndown application procedures, and preemergence application procedures.

The application procedures may include a minimum application procedure (e.g., in terms of gallons of spray mixture per acre). The application procedures may include standards defined by one or more standards body (e.g., a spray nozzle coarseness standard set by the American Society of Agricultural Engineers (ASAE)), spray nozzle height settings, pressure and speed settings, etc.

Further still, the application procedures may include specific instructions for banded application. Banded application may include band treatment equations for determining a broadcast equivalent rate and volume per acre. For example, the label 200 may include a product per acre equation:

(band width in inches/row width in inches)*broadcast rate per acre.

And the amount of band spray volume needed per acre equation:

(band width in inches/row width in inches)*broadcast spray volume per acre

The label 200 may include a material safety data sheet (MSDS) including information such as first aid measures, firefighting measures, accidental release measures, handling and storage procedures, etc.

As noted, label 200 relates to a pesticide. However, in practice, the grower may use many (e.g., ten or more) additional/alternate crop protection products, selected from categories ranging from the routine to the exotic. For example, a grower may employ a bactericide, a fumigant, a mating disruption compound, a pH adjuvant, a pH reducer, a root stimulant, a stump remover, a water conditioner, etc. Each label type may include product-specific application and safety procedures.

Moreover, it will be appreciated by those of ordinary skill in the art that each of the foregoing example additional/alternate crop protection/enhancement product categories may include one or more competing products (e.g., a grower may select from ten or more fumigants) and each competing product may include its own distinct set of labeling, product application procedures, regional (e.g., state) restrictions, etc.

The label 200 may include regional restrictions (e.g., state-by-state restrictions). For example, the label 200 may include a first set of restrictions relating to water table, surface soil texture, subsoil texture and average organic matter concentration by weight directed a first plurality of states including Alabama and West Virginia. The label 200 may further include a second set of restrictions relating to water table, surface soil texture, subsoil texture and average organic matter concentration by weight directed a first plurality of states including Iowa and Wyoming. The label 200 may be self-referential. For example, a second section of the label 200 may refer to a first section of the label 200 in prescribing certain procedures.

As discussed above with respect to the label analysis module, the present techniques may include methods and systems for extracting information from the label 200. Examples of information that may be extracted include: the written procedures (e.g., field attributes, regulatory approvals, chemical information, precautions, environmental hazards, runoff/drainage warnings, setback procedures, application procedures, mixing procedures, timing information, banded application procedures including per-acre equations, etc.). Once the information is extracted, the present techniques may include generation and delivery of a computer application for displaying the extracted information, as shown in FIGS. 3A and 3B.

Exemplary Graphical Interface Embodiments

Figure 3A:
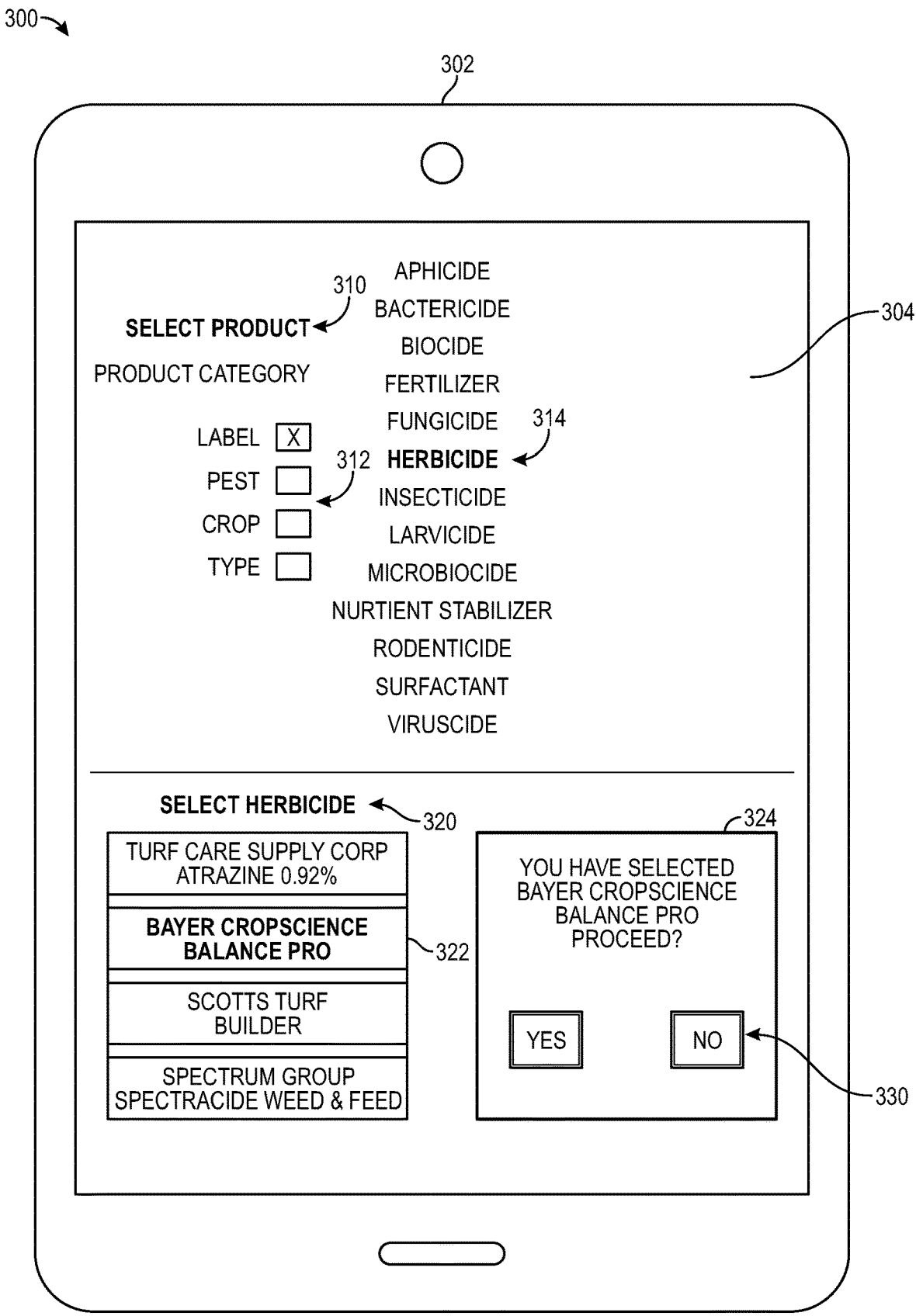
FIG. 3A depicts an exemplary computing device including an application configured to display a graphical user interface for crop protection and enhancement product selection, according to one embodiment.
Figure 3B:
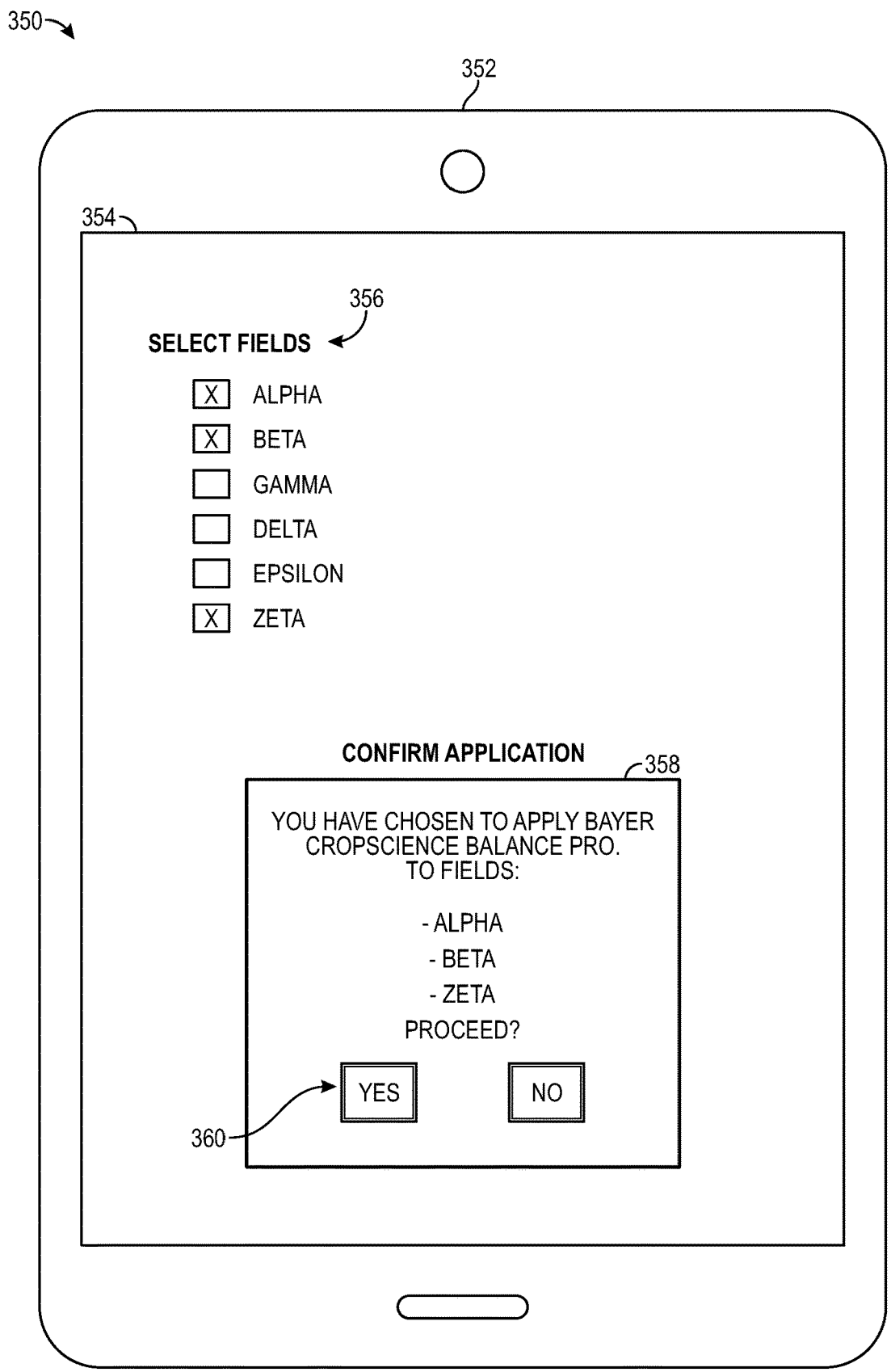
FIG. 3B depicts an exemplary computing device including an application configured to display a graphical user interface for field selection, according to one embodiment.

FIG. 3A depicts an exemplary computing environment 300 including a computing device 302. The computing device 302 includes instructions for displaying a GUI 304 that facilitates user viewing, browsing, and selection of crop protection and enhancement products, according to one embodiment.

For example, the computing device 302 may correspond to the client computing device 102 of FIG. 1. The mobile application 118 may generate the GUI 304, in some embodiments. The GUI 304 may be displayed in the output device 124. The GUI 304 may include instructions for receiving user inputs via the input device 122.

Specifically, the GUI 304 includes a product category menu 310, from which the user may select one or more product categories 312. The GUI 304 may include instructions for displaying one or more label categories 314 when the user selects the one or more product categories 312. The GUI 304 may include further instructions for displaying a label menu 320 when the user selects the one or more label categories 314. The GUI 304 may include instructions for displaying a product confirmation menu 324 when the user selects a labeled product 322. The GUI 304 may include a confirmation button 330 enabling the user to confirm the user's selected labeled product 322. The GUI 304 may receive/retrieve the information included in the GUI 304 from a database (e.g., from a remote database such as the database 180). The user may repeat the process to select one or more additional selected labeled product. In some embodiments, the GUI 304 may be configured to allow the user to make multiple simultaneous selections.

The GUI 304 may include instructions for submitting a request (e.g., an HTTP POST request) when the user accesses the confirmation button 330. As discussed above, the request may be transmitted via a computer network (e.g., the network 108) and received by a remote computing device. The GUI 304 may receive a response from the remote computing device and display one or more additional GUIs, for example, the GUI shown in FIG. 3B.

FIG. 3B depicts an exemplary computing environment 350 including a computing device 352. The computing device 352 includes instructions for displaying a GUI 354 that facilitates user viewing, browsing, and selection of fields for applying crop protection and enhancement products, according to one embodiment.

The GUI 354 may include instructions for receiving and displaying one or more fields 356. The fields 356 may be associated with an account of the user in the remote database, for example. As noted above, in some embodiments, the user may be required to authenticate before the user is able to access the GUI 304 and/or the GUI 354. The user may select one or more of the fields 356. In response to the user's selection, the GUI 354 may display a confirmation menu 358, including a confirmation button 360. When the user selects the confirmation button, the GUI 354 may transmit an indication of the selected field or fields to the remote computing device.

Figure 4:
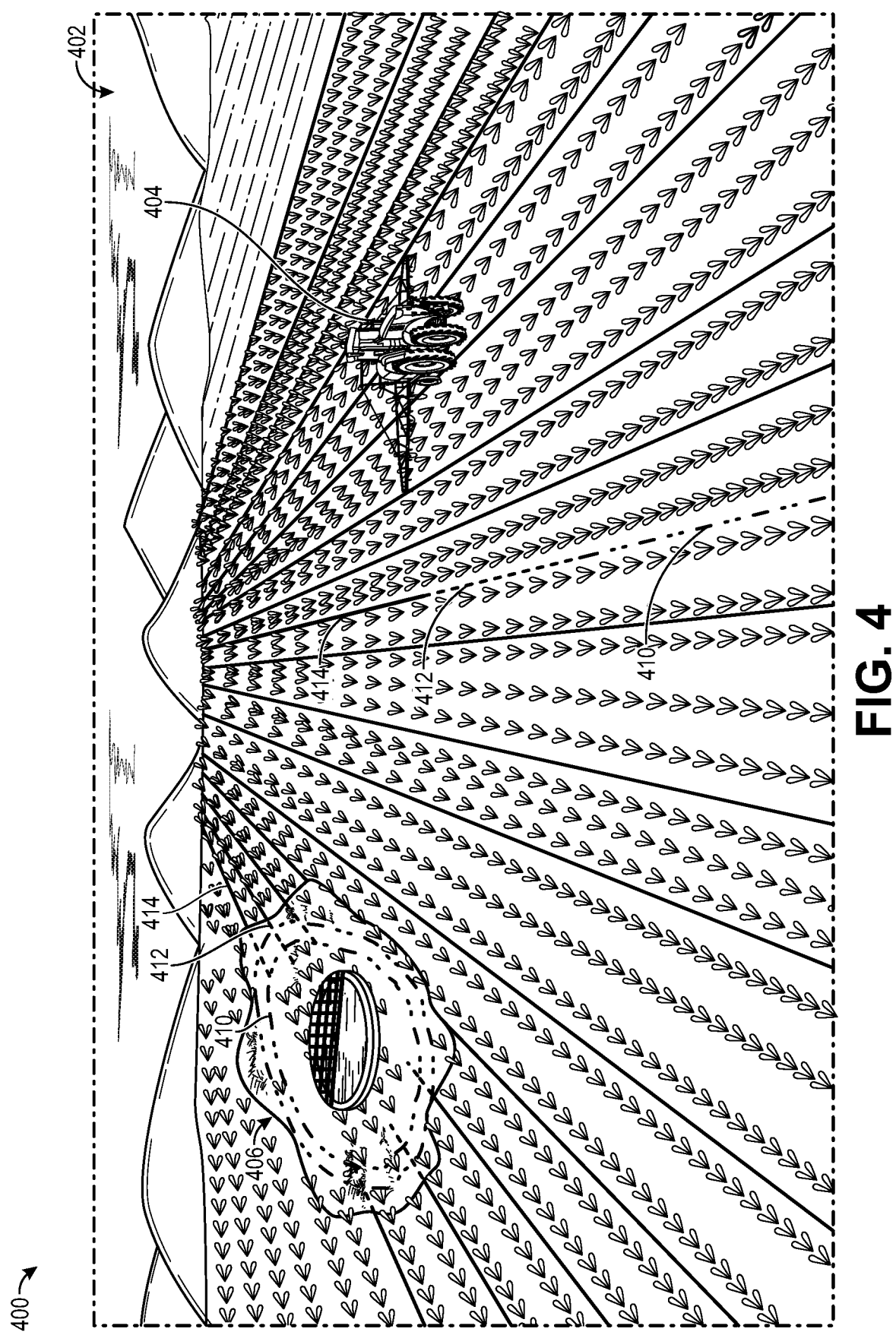
FIG. 4 depicts an exemplary field perspective diagram illustrating extracted protection and enhancement label information, according to one embodiment.
Figure 5:
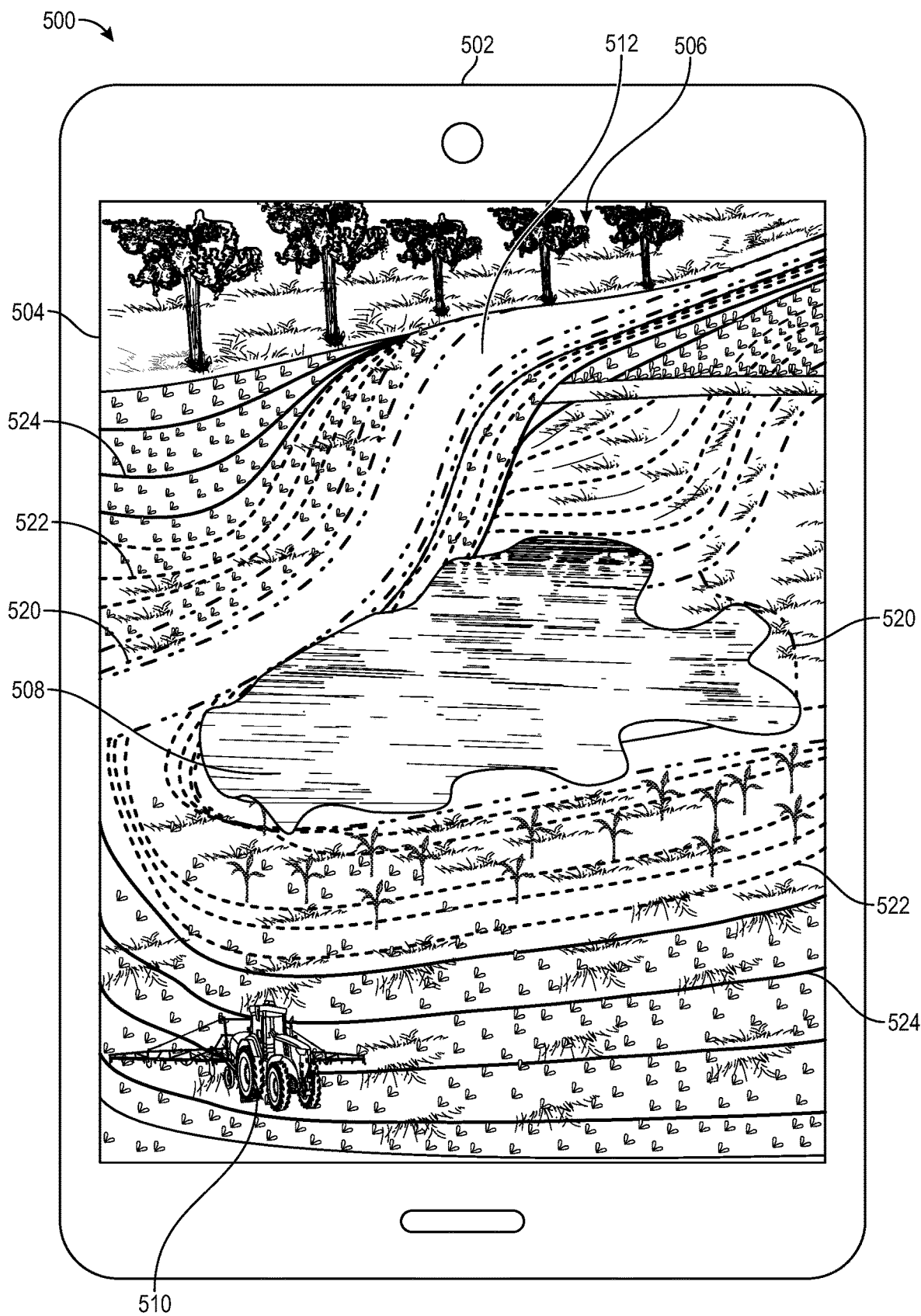
FIG. 5 depicts an exemplary field map graphical user interface for displaying crop protection and enhancement field visualizations, according to one embodiment.

In response to the user's having selected (i) one or more labeled products and (ii) one or more fields, the remote computing device may generate and deliver a prescription to one or more implements, as discussed above. FIG. 4 and FIG. 5 depict prescription visualizations, including path information generated by applying procedures extracted from a label (e.g., the label 200 and/or the label 322) to the specific characteristics of the selected fields 356.

Exemplary Visualization Embodiments

FIG. 4 depicts an exemplary field perspective visualization diagram 400 illustrating application of a crop enhancement/protection product using information extracted from a treatment product label, according to one embodiment. The visualization diagram 400 includes a field map 402 and an implement 404. The implement 404 may correspond to the implement 102 of FIG. 1, in some embodiments. The field map 402 may be planted with a crop (e.g., soybeans).

The field map 402 includes a groundwater area 406 (e.g., a well, a pond, a stream, etc.). The visualization diagram 400 includes a plurality of paths. The paths are driven by the implement 404 and may include straight or curved lines. The paths visually represent information through the use of any suitable visual indicators/emphasis (e.g., color). In the depicted example, patterns of unbroken and broken lines are used to depict different rate application ranges.

For example, the visualization diagram 400 includes a path 410 corresponding to a first application rate. The first application rate may be a zero application rate, in some embodiments. Specifically, the path 410 may correspond to areas within the field wherein an implement (e.g., a sprayer) closes all nozzle valves. For purposes of the present techniques, a "rate" may refer to any suitable ratio of crop enhancing/protecting product to another unit (e.g., time, distance).

The visualization diagram 400 may further include a path 412 corresponding to a second application rate. The second application rate may be a reduced non-zero application rate, in some embodiments. For example, the implement 404 may apply a reduced amount of the crop enhancement/protection product about the groundwater well 406. The mapping module 158 may draw the path 412 about the groundwater well 406 consistent with setback information extracted from the label of the crop enhancement/protection product.

The visualization diagram 400 may further include a path 414 corresponding to a third application rate. The third application rate may be a non-zero application rate, in some embodiments. For example, the implement 404 may apply a full amount of the crop enhancement/protection product in some areas of the field map 402. The first application rate may be a default application rate of an herbicide, for example. As discussed above, the mapping module 158 may create the paths 410-414 and their respective application rates. As discussed above, the application rates may also be determined by reference to soil data measures (e.g., OM concentration) and the presence of groundwater or other concerns (e.g., neighboring crops). Concerns regarding neighboring crops are not trivial. Some species (e.g., tomatoes) are highly sensitive to any cross-contamination (e.g., from wind).

It should be appreciated that in some embodiments the paths 410-414 may represent different information. For example, in the above example, the paths 410-414 represent respective application spray rates. However, in some embodiments, the paths 410-414 may represent seeding rates. In still further embodiments, the paths 410-414 may represent soil texture (e.g., sand fraction). It should be further appreciated that the visualization capabilities of the present techniques advantageously improve the ability of users of automated agricultural systems to quickly determine latent information of the field illustrated by the field map 402 and to apply crop enhancement/protection product in an safe and efficient manner.

In some embodiments, the visualization diagram 400 may be depicted as a flat map, rather than as a perspective diagram. In some embodiments, aspects of the field perspective visualization diagram 400 may be displayed in a client computing device 102, as depicted in FIG. 5.

FIG. 5 depicts an exemplary computing environment 500 including a computing device 502. The computing device 502 includes instructions for displaying a GUI 504 that facilitates user viewing of a field map 506. The field map 506 includes ground water body 508, an implement 510, and a road 512. The road field map 510 may correspond to the implement 404 in some embodiments. The field map 506 further includes a path 520, a path 522 and a path 524 each of which corresponds, respectively, to the path 410, the path 412 and the path 414 of FIG. 4.

In other words, the path 520 is the path nearest to the body of water 508 and/or the road 512. The path 522 is the path next farthest away from the body of water 508, followed by the path 524, which is the farthest away. FIG. 5 demonstrates that the paths may be significantly curved to accommodate not only irregularly-shaped objects that appear in nature but also changes in slope/elevation. As noted above, one or more paths may be included. In some embodiments, the user may toggle between a perspective view and a flat map view. The GUI 504 may include instructions for redrawing the field map 506. For example, the GUI 504 may automatically pan the frame of the field map 506 location of the implement 510 changes.

Although FIG. 4 and FIG. 5 discuss the present techniques in terms of a field of crops, it should be appreciated that the present techniques are equally applicable to other field types, including fields lacking crops. For example, the present techniques are applicable in the turf grass industry (e.g., in golf course management) and advantageously improve conventional techniques. For example, by treating the turf grass according to the underlying soil characteristics, the present techniques improve over one-size-fits-all application that is currently performed. In some embodiments, an implement may detect the location of the implement in relation to one or more turf regions (e.g., a green, a fairway, a rough, etc.) and perform an action (e.g., mix an active ingredient, turn one pump off and another pump on) when the implement transitions between regions. Additionally, the turf grass implement may use an injection attachment instead of a sprayer attachment to deliver the product. In general, the present techniques may include the use of any suitable attachments and/or delivery systems.

Exemplary Methods

Figure 6:
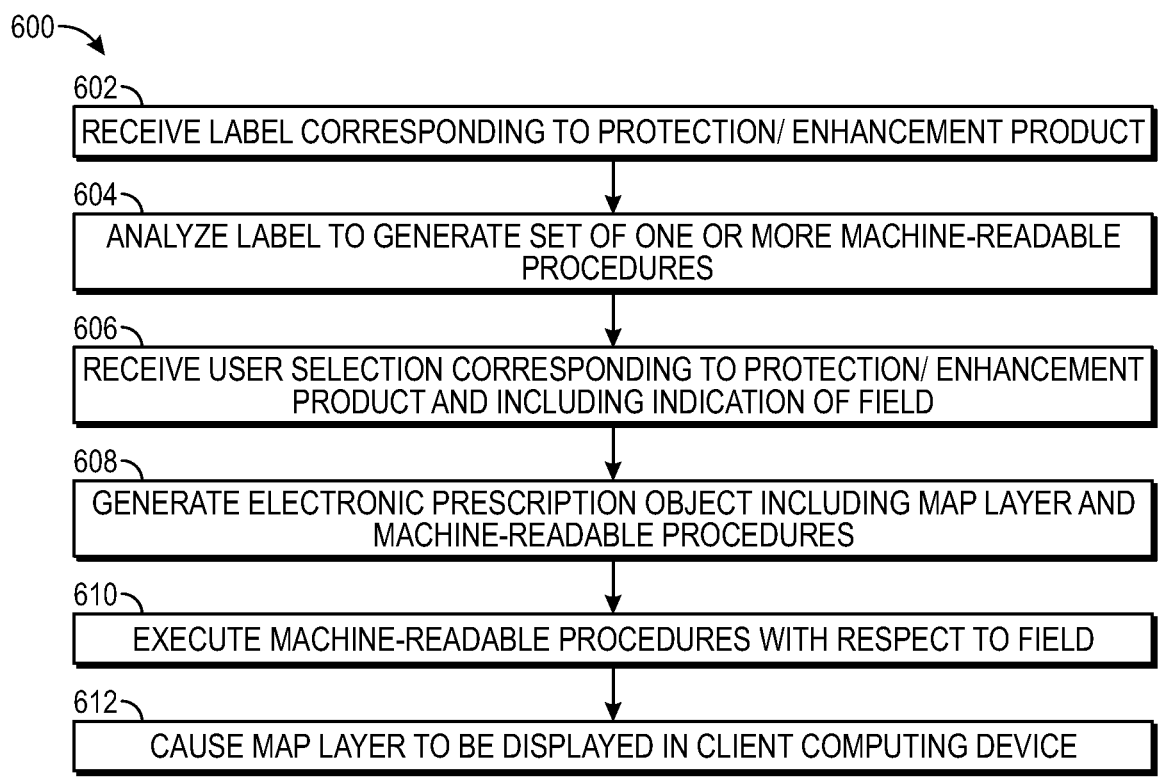
FIG. 6 depicts an exemplary computer-implemented method for performing systematic application of crop protection and enhancement products, according to one embodiment and scenario.

FIG. 6 depicts a flow diagram of an example method 600 for systematic application of a protection/enhancement product. The method 600 may include receiving, via one or more processors, a label corresponding to the protection/enhancement product (block 602). For example, the label analysis module 150 of FIG. 1 may include instructions for crawling the web sites of product purveyors and/or other sources (e.g., EPA.gov) and automatically downloading product label documentation such as the label 200 of FIG. 2 into the database 180. For example, the product may include any crop enhancement/protection matter, including a pesticide, a fertilizer, seed, etc. as discussed herein.

The method 600 may include analyzing the label to generate a set of one or more machine-readable procedures (block 604). As noted above, the machine-readable procedures may include attributes and/or a script or computer code (e.g., one or more conditional statements, expressions, rules, etc.).

The method 600 may include receiving, via a graphical user interface, a user selection corresponding to the protection/enhancement product, the user selection including an indication of one or more fields (block 606). For example, the user selection may include a respective alphanumeric string corresponding to the one or more fields and the protection/enhancement product. The graphical user interface may correspond to the GUI 304, for example.

The method 600 may include generating, via one or more processors, an electronic prescription object including one or more map layers and the set of one or more machine-readable procedures (block 608). The electronic prescription object may include references to one or more fields including, for example, the type of implement(s) available for use within the field and the crop planted in each respective field. The electronic prescription object may include an identification of one or more products to apply, and an indication of which field or fields to apply the product to. The machine-readable procedures may include instructions for applying the product and an application rate. The layers may correspond to the layers composing the field map 402 or the layers composing the field map 406, for example.

The method 600 may include executing the one or more machine-readable procedures with respect to the one or more fields (block 610). The mobile application 118 may include a runtime or interpreter for executing the one or more machine-readable procedures. In some cases, the mobile application 118 may include implement-specific software libraries provided by the implement manufacturer that the agrilytics company may access to carry out the machine-readable procedures. For example, an implement may include instructions for opening a flow control valve. The instructions may include a function that accepts as a parameter an absolute value (e.g., from 1-100) representing the status of the valve. The mobile application 118 may provide a parameter to the function from the machine-readable procedures. In other cases, the mobile application 118 may execute logic for avoiding groundwater water included in the machine-readable procedures. As discussed above, the procedures may analyze soil data and operate the implement according to additional rules/logic. It should be envisioned that many types of procedures are envisioned.

The method 600 may include causing the one or more map layers to be displayed in a client computing device (block 612). For example, the mobile application 118 may analyze the location of the implement and the proximity of the implement to objects within the map layer, such as map objects representing water, roads, other crops, human habitation areas, protected areas, etc. The mobile application 118 may analyze the location in relation to other elements, for example when executing the setback procedures. As discussed above, the map layers may be geospatial data files that include rich mapping functionality, including the location of elements such as wells, ponds, roads and other features.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. Â§ 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed:

1. A computer-implemented method for systematic application of a crop protection/enhancement product, the method comprising
receiving, via one or more processors, a label corresponding to the crop protection/enhancement product;
analyzing the label to generate a set of one or more machine-readable procedures;
receiving, via a graphical user interface, a user selection indicating (i) the crop protection/enhancement product and (ii) one or more fields;
generating, via one or more processors, an electronic prescription object including one or more map layers and the set of one or more machine-readable procedures;
causing, via one or more processors, a client computing device to execute the one or more machine-readable procedures with respect to the one or more fields; and
causing the one or more map layers to be displayed in a graphical user interface of the client computing device.

2. The computer-implemented method of claim 1, wherein the crop protection/enhancement product is a pesticide.

3. The computer-implemented method of claim 1, wherein analyzing the label to generate the set of one or more machine-readable procedures includes analyzing the label using one or both of (i) one or more regular expressions, and (ii) one or more machine learning models.

4. The computer-implemented method of claim 1, wherein generating, via the one or more processors, the electronic prescription object including the one or more map layers and the set of one or more machine-readable procedures includes analyzing one or both of (i) the soil characteristics of the one or more fields, and (ii) the geographic characteristics of the one or more fields.

5. The computer-implemented method of claim 1, wherein executing the one or more machine-readable procedures with respect to the one or more fields includes one or both of (i) applying the crop protection/enhancement product to the field, and (ii) avoiding environmental damage to the field.

6. The computer-implemented method of claim 5, wherein avoiding the environmental damage to the field includes determining the proximity of an implement within the field to a groundwater source, and executing a setback procedure to cause the implement to avoid the groundwater source.

7. The computer-implemented method of claim 1, further comprising
causing an alarm notification to be transmitted to the user based on the user's operation of an implement.

8. A computing system comprising:
one or more processors; and
one or more memories storing instructions that, when executed by the one or more processors, cause the computing system to:
receive, via one or more processors, a label corresponding to a crop protection/enhancement product;
analyze the label to generate a set of one or more machine-readable procedures;
receive, via a graphical user interface, a user selection indicating (i) the crop protection/enhancement product and (ii) one or more fields;
generate, via one or more processors, an electronic prescription object including one or more map layers and the set of one or more machine-readable procedures;
cause, via one or more processors, a client computing device to execute the one or more machine-readable procedures with respect to the one or more fields; and
cause the one or more map layers to be displayed in a graphical user interface of the client computing device.

9. The computing system of claim 8, wherein the crop protection/enhancement product is a pesticide.

10. The computing system of claim 8, the one or more memories including further instructions that, when executed by the one or more processors, cause the computing system to:
analyze the label using one or both of (i) one or more regular expressions, and (ii) one or more machine learning models.

11. The computing system of claim 8, the one or more memories including further instructions that, when executed by the one or more processors, cause the computing system to:
analyze one or both of (i) the soil characteristics of the one or more fields, and (ii) the geographic characteristics of the one or more fields.

12. The computing system of claim 8, the one or more memories including further instructions that, when executed by the one or more processors, cause the computing system to:
apply the crop protection/enhancement product to the field, and/or avoid environmental damage to the field, and/or prevent damage to the planted/growing crop.

13. The computing system of claim 8, the one or more memories including further instructions that, when executed by the one or more processors, cause the computing system to:
determine the proximity of an implement within the field to a groundwater source, and execute a setback procedure to cause the implement to avoid the groundwater source.

14. The computing system of claim 8, the one or more memories including further instructions that, when executed by the one or more processors, cause the computing system to:
cause an alarm notification to be transmitted to the user based on the user's operation of an implement.

15. A non-transitory computer readable medium containing program instructions that when executed, cause a computer to:
receive, via one or more processors, a label corresponding to a crop protection/enhancement product;
analyze the label to generate a set of one or more machine-readable procedures;
receive, via a graphical user interface, a user selection indicating (i) the crop protection/enhancement product and (ii) one or more fields;
generate, via one or more processors, an electronic prescription object including one or more map layers and the set of one or more machine-readable procedures;
causing, via one or more processors, a client computing device to execute the one or more machine-readable procedures with respect to the one or more fields; and
cause the one or more map layers to be displayed in a graphical user interface of the client computing device.

16. The non-transitory computer readable medium of claim 15 wherein the protection/enhancement product is a pesticide.

17. The non-transitory computer readable medium of claim 15 containing further program instructions that when executed, cause a computer to:
analyze the label using one or both of (i) one or more regular expressions, and (ii) one or more machine learning models.

18. The non-transitory computer readable medium of claim 15 containing further program instructions that when executed, cause a computer to:
analyze one or both of (i) the soil characteristics of the one or more fields, and (ii) the geographic characteristics of the one or more fields.

19. The non-transitory computer readable medium of claim 15 containing further program instructions that when executed, cause a computer to:
apply the protection/enhancement product to the field, or avoid environmental damage to the field.

20. The non-transitory computer readable medium of claim 15 containing further program instructions that when executed, cause a computer to:
determine the proximity of an implement within the field to a groundwater source, and execute a setback procedure to cause the implement to avoid the groundwater source.

* * * * *